(12) United States Patent
Zietlow et al.

(10) Patent No.: US 9,700,919 B1
(45) Date of Patent: Jul. 11, 2017

(54) METHOD AND SYSTEM FOR PRODUCING GLUTEN-FREE OATS

(71) Applicant: General Mills, Inc., Minneapolis, MN (US)

(72) Inventors: Philip K Zietlow, Wayzata, MN (US); Daniel J Winderl, Plymouth, MN (US); Jay Romsa, North Mankato, MN (US); Kara M Hobart, New Hope, MN (US); John M Hellweg, Minnetonka, MN (US); Troy D Bierbaum, Brooklyn Park, MN (US)

(73) Assignee: General Mills, Inc., Minneapolis, MN (US)

( * ) Notice: Subject to any disclaimer, the term of this patent is extended or adjusted under 35 U.S.C. 154(b) by 559 days.

(21) Appl. No.: 13/673,231

(22) Filed: Nov. 9, 2012

(51) Int. Cl.
*B07B 9/00* (2006.01)
*B07B 13/00* (2006.01)
*B07B 13/04* (2006.01)
*B07B 15/00* (2006.01)

(52) U.S. Cl.
CPC .............. *B07B 9/00* (2013.01); *B07B 13/00* (2013.01); *B07B 13/04* (2013.01); *B07B 15/00* (2013.01)

(58) Field of Classification Search
CPC B07B 4/00; B07B 13/04; B07B 13/10; B07B 9/00; B07B 15/00
USPC .......................................... 209/12.1, 13, 19
See application file for complete search history.

(56) References Cited

U.S. PATENT DOCUMENTS

| | | | |
|---|---|---|---|
| 45,796 A | 1/1865 | Ogborn | |
| 178,257 A | 6/1876 | Snavely et al. | |
| 183,059 A | 10/1876 | Leach | |
| 209,208 A | 10/1878 | Allonas | |
| 677,789 A | 7/1901 | Nagel | |
| 788,839 A | 5/1905 | MacDonald | |
| 896,891 A | 8/1908 | Campbell | |
| 985,696 A | 2/1911 | Pearce | |
| 988,707 A | 4/1911 | Hedfeldt | |
| 1,179,875 A | 4/1916 | Venus | |
| 1,327,193 A | 1/1920 | Braddy | |
| 1,339,161 A | 5/1920 | Bryan | |
| 1,356,043 A | 10/1920 | Cowan | |
| 1,398,162 A | 11/1921 | Stansbury | |
| 1,974,309 A | 9/1934 | Jones | |
| 2,125,812 A | 8/1938 | Robertson | |
| 2,864,702 A | 12/1958 | Murray et al. | |
| 3,833,118 A * | 9/1974 | Gilmore et al. | ............... 209/28 |
| 3,901,725 A | 8/1975 | Bond et al. | |
| 4,208,274 A * | 6/1980 | Satake et al. | ............... 209/44.2 |

(Continued)

FOREIGN PATENT DOCUMENTS

GB 855597 12/1960

*Primary Examiner* — Jeremy R Severson
(74) *Attorney, Agent, or Firm* — Diederiks & Whitelaw, PLC; Gregory P. Kaihoi, Esq.

(57) ABSTRACT

A method and system for removing foreign grains from oat grains to establish gluten-free oats, i.e., oat grains having gluten levels below 20 ppm and, more preferably, below 10 ppm, relies upon performing a series of mechanical differentiation operations on a combination of grains, including oats and foreign, or gluten containing, grains. The various operations include aspiration, width grading and length grading steps, as well as a late stage density separating step. The resulting oats can be used to make a wide range of gluten-free oat food products, including cereal and granola products.

20 Claims, 1 Drawing Sheet

(56) References Cited

U.S. PATENT DOCUMENTS

| | | | | |
|---|---|---|---|---|
| 4,384,953 A | * | 5/1983 | Christian | 209/137 |
| 4,466,542 A | * | 8/1984 | Oetiker et al. | 209/44.2 |
| 4,840,727 A | * | 6/1989 | Humphrey | 209/32 |
| 5,019,242 A | * | 5/1991 | Donelson | 209/29 |
| 5,301,811 A | * | 4/1994 | Mueller | 209/44.2 |
| 5,597,076 A | * | 1/1997 | Kershner | 209/29 |
| 5,860,531 A | * | 1/1999 | Satoru | B03B 4/02 209/30 |
| 6,113,908 A | | 9/2000 | Paton et al. | |
| 6,253,928 B1 | * | 7/2001 | Weber | 209/683 |
| 6,602,130 B1 | * | 8/2003 | Manning et al. | 460/100 |
| 7,891,498 B2 | * | 2/2011 | Ernst | 209/687 |
| 9,364,866 B2 | * | 6/2016 | Davis | B07C 5/3425 |
| 9,463,493 B1 | * | 10/2016 | Arlinghaus | B07C 5/3425 |
| 2005/0089602 A1 | | 4/2005 | Kvist et al. | |
| 2009/0311376 A1 | * | 12/2009 | Rao et al. | 426/28 |
| 2016/0207048 A1 | * | 7/2016 | Zietlow | B02B 5/02 |
| 2017/0001220 A1 | * | 1/2017 | Arlinghaus | B07C 5/3425 |

\* cited by examiner

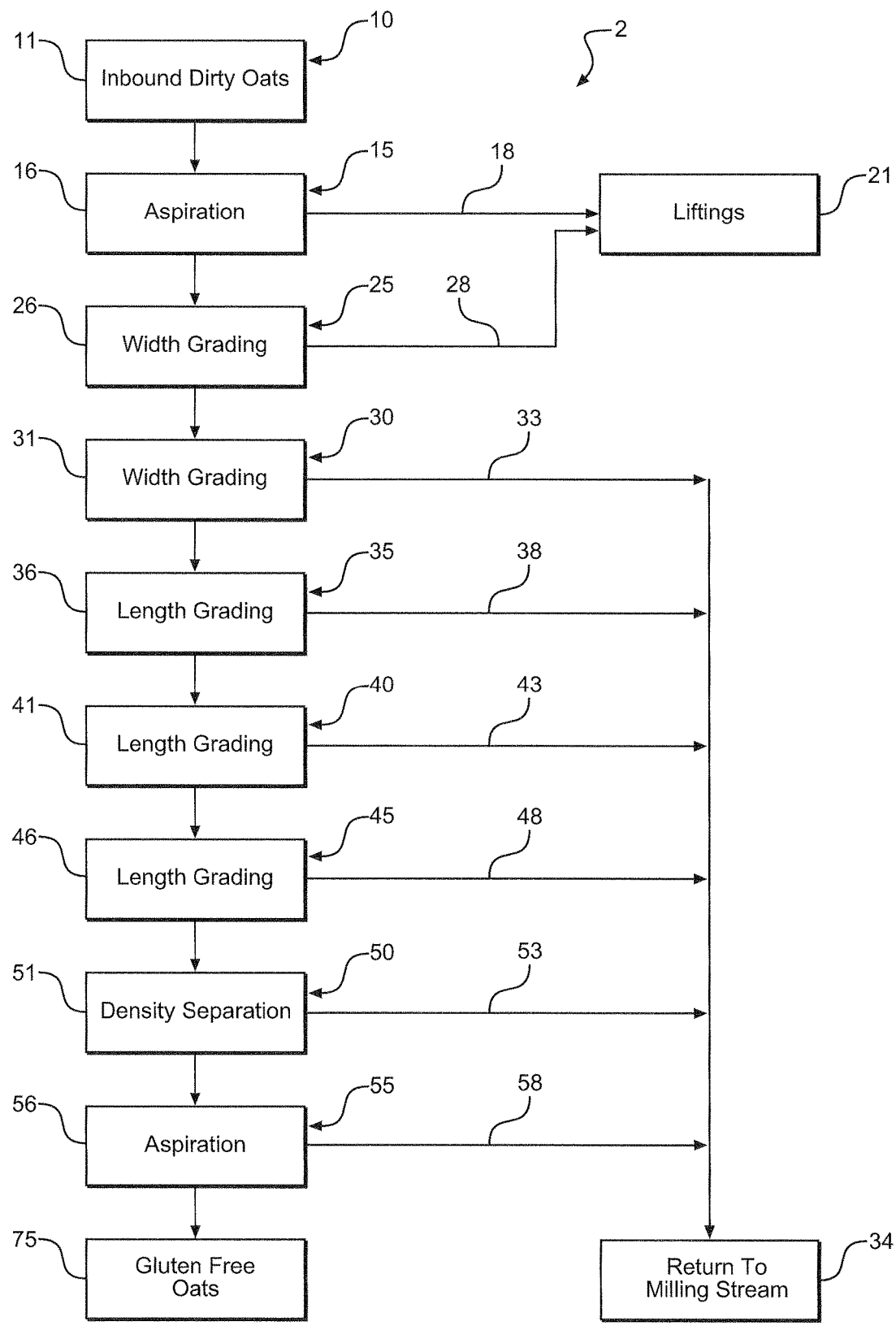

METHOD AND SYSTEM FOR PRODUCING GLUTEN-FREE OATS

FIELD OF THE INVENTION

The invention generally pertains to the sorting of grains and, more particularly, a method and system for separating oat grains from foreign grains and other contaminants in order to produce gluten-free oats, i.e., oats having gluten levels below 20 ppm and, more preferably, less than 10 ppm.

BACKGROUND OF THE INVENTION

Sensitivity to gluten is estimated at afflicting up to 2% of the population. In fact, based on the increased awareness of Celiac disease and gluten intolerance, gluten levels in certain foods can be a limiting factor in consumption. Oats themselves do not contain gluten. However, oats cultivated in North America, Europe and even other parts of the world are commonly contaminated by gluten containing foreign grains, including wheat, barley, rye and triticale. These foreign grains typically exhibit about 14% by weight protein, with 40% of the protein being attributable to gluten such that approximately 5.6% by weight of the grains is gluten. This contamination is commonly known to come from various sources, mainly from the rotation of small grain crops on the same land, with residual contaminating seeds germinating with a seeded oat crop. In addition, contamination from other grains which are harvested, transported, stored and merchandized in common with oats is a contributing factor. As a result, it is not uncommon to find from 0.5% to 5.0% of these other grains mixed with commercially marketed oats. Therefore, absent dedicating land, harvesting equipment, transporting vehicles, storage units, packaging and production facilities, and the like only for use in connection with oats, cross contamination is inevitable.

Although the federal government has not finalized rules for labeling products "gluten-free", the American regulations will likely be similar to the Codex rules established in Europe, which stipulate a maximum of 20 ppm gluten in "gluten-free" food products. Based on draft proposals from the United States Food and Drug Administration, oats will continue to be eligible for gluten-free labeling as long as they are substantially free of foreign seeds. With this in mind, separating oats from foreign grains and other contaminants is required if oat products are to be produced to mandated gluten levels.

Known grain sorting techniques typically rely on mechanical or optical systems. Mechanical systems are considered advantageous generally based on their simplicity and cost benefits. However, simply put, previous attempts to employ mechanical sorting machines have failed to consistently deliver oats without undesirably high levels of gluten contaminants. Optical systems generally employ multiple cameras to view grain falling toward a grain rejection mechanism. In some machines, duplicate optical units are positioned on opposite sides of a sorter to provide simultaneous images of opposing sides of the grains. In general, optical sorters have higher associated costs and known optical sorters also have not been sufficiently effective in achieving the reduced gluten levels desired in accordance with the invention. Therefore, there is seen to exist a need to provide a method and apparatus for effectively and efficiently decontaminating oat grains in order to produce gluten-free oats useable for various purposes, particularly as an oat ingredient in the production of various food products, including cereal and granola.

SUMMARY OF THE INVENTION

The present invention is directed to a method and system for removing foreign grains from oat grains to establish gluten-free oats, i.e., oat grains having gluten levels below 20 ppm and, more preferably, below 10 ppm. The present invention relies upon performing a series of mechanical differentiation operations on a combination of grains, including gluten-free oats and foreign, or gluten containing, grains. More specifically, following initial cleaning and aspirating operations, numerous successive sizing operations employing mechanical width and length graders are performed. In particular, the grains are processed through multiple width and multiple length grading operations in establishing a processed combination of grains. Thereafter, the processed combination of grains is density separated to establish gluten-free oats. Performing the series of grading operations in combination with the late stage density separation has been found to reduce the percentages of contaminating grains to less than approximately 0.035% by weight versus the oat grains based on the 20 ppm level. In accordance with an aspect of the invention, a subsequent aspiration step can also be performed following the late density separation phase.

The resulting oats can be used to make a wide range of gluten-free oat food products, including cereal and granola products. In accordance with the invention, the very low level of gluten is advantageously achieved without the need to de-hull the oats. In any case, additional objects, features and advantages of the invention will become more readily apparent from the following detailed description of preferred embodiments thereof when taken in conjunction with the provided drawing.

BRIEF DESCRIPTION OF THE DRAWINGS

The FIGURE is a flow chart representing a first series of operations performed in connection with the method and system of the invention.

DETAILED DESCRIPTION OF INVENTION

As indicated above, the invention is directed to a method and system for separating oat grains from foreign grains and other contaminants in order to produce gluten-free oats. By "gluten-free", it is meant that the oats have gluten levels below 20 ppm and, more preferably, less than 10 ppm. In general, the method and system of the invention is practiced by utilizing mechanical separation techniques, thereby being effective at a low cost, to reduce starting gluten levels of about 1000-1200 ppm to achieve gluten-free oats for consumer food production. In general, following basic cleaning operations, a series of mechanical differentiation operations are performed on a combination of grains, particularly a series of multiple width and multiple length grading steps, followed by a late stage density separation step. Overall, the invention has been found effective in separating oat grains from the contaminant grains, resulting in up to 99.985% (based on a 10 ppm level) oats in the resulting supply, thereby achieving the gluten-free goal as detailed further below.

With initial reference to The FIGURE, the system and method of the invention is generally indicated at 2. The starting point is indicated at step 10 wherein a supply of inbound dirty oats 11 is received. For purposes of setting forth an exemplary embodiment of the overall method of the invention, an input supply flow of 2000 bu/hr will be used as a reference. In any case, inbound dirty oats 11 include a combination of grains, including oat grains and various foreign grains, as well as potentially other contaminants. As the oat grains themselves are gluten-free, it is desired to separate the oat grains from the foreign grains and other gluten containing contaminants. As shown, the inbound dirty oats 11 are processed through an initial aspiration step at 15. Initial aspiration step 15 is preferably performed using a channel aspirator 16 designed to remove any chaff, dust or empty oats which can be conveyed along line 18 from the overall combination of grains. Collectively, the chaff, dust and/or empty oats constitute liftings 21 which are removed from the overall stream. Although the structure and operation of aspirator 16 could vary in accordance with the invention, it is preferred to provide for low aspiration, such as in the order of 2050-2100 bu/hr. Overall, aspiration step 15 removes about 1% of the contaminants, particularly non-grain contaminants.

Following aspiration step 15, the combination of grains proceed to various width grading and then length grading steps, shown to include a first width grading step 25 employing a width grader 26. Removed grains from this width grading operation are conveyed along line 28 to be combined with liftings 21. Although various known grading and separation equipment can be employed, the invention preferably employs a slotted tri-bar screen in a cylinder as width grader 26. In one particular embodiment, it is desired to provide a grading rate of approximately 2050 bu/hr utilizing a $^{9}/_{64} \times ^{3}/_{4}$ slotted tri-bar screen-type width grader 26. For the sake of completeness, it has been found that having width grader 26 exhibit a width grade in the order of $8^{10}/_{64}$ inches has proven effective to remove an additional 1% of the contaminants, particularly non-grain contaminants.

Width grading step 25 is followed by a second width grading step 30 which employs a width grader 31. Contaminants removed by width grader 31 are conveyed along line 33 to a milling return stream 34. The grains in milling return stream 34 can be employed in connection with making other food products which are not slated to be gluten-free or further processed in ways outside the scope of the present invention to establish an additional supply of low level gluten oats. In general, width grader 31 sorts based on size of the oat stem and, in a preferred embodiment, allows about two-thirds of the present grain supply to pass, i.e., about 35% of the grain stream is removed along line 33. In a particular embodiment, a $^{9}/_{64}$ width grader 31 is employed, operating at a rate of about 1280 bu/hr.

Subsequent to width grading steps 25 and 30, the remaining combination of grains proceeds through a series of mechanical length grading operations. That is, the combination of grains is subject to a first length grading step at 35 employing a length grader 36 which removes additional gluten-containing contaminants along line 38, a second length grading step at 40 employing a length grader 41 which removes even more gluten-containing contaminants along line 43, and a third length grading step 45 employing a length grader 46 which removes further gluten-containing contaminants along line 48, with each of lines 38, 43 and 48 leading to milling return stream 34. In connection with these crucial steps, the processing must be controlled based on the selected machinery in order to provide effective separation. In accordance with a preferred embodiment, indent length grading cylinders are employed, with the indent length graders being composed of metal cylinders with indent pockets pushed out from the center. The size of the indent pockets determines the length of the grain which will fall into the pocket and be lifted out of remaining, larger grains as the cylinder rotates. This lifted material falls into a trough in the center of the cylinder and is conveyed out of the machine with a screw conveyor. The larger grains slide and tumble to the bottom of the rotating cylinder and make their way to a discharge region of the cylinder. Typically, indent cylinders are about 90% efficient. However, to achieve the results desired for the invention, this efficiency has to be much higher. In essence, in order to remove gluten containing grains from oats to the level of less than 10 ppm, the present process needs to essentially be 99.985% efficient (equating to allowing only the passage of about 2 gluten containing grains in 11000 grains of oats).

By way of example, a commercial $^{20}/_{64}$ inch indent length grader having a 23 inch diameter by 85 inch long cylinder presents 29700 indents per revolution. At 55 rev/min, the total indents is 1633500 per minute. Therefore, the ratio of indents to grain passing through at various rates are as follows:

15 lb/min×11000 grains/lb=165000 grains/min; indents/grain ratio=9.9

20 lb/min×11000 grains/lb=220000 grains/min; indents/grain ratio=7.4

25 lb/min×11000 grains/lb=275000 grains/min; indents/grain ratio=5.9

30 lb/min×11000 grains/lb=330000 grains/min; indents/grain ratio=5.0

40 lb/min×11000 grains/lb=440000 grains/min; indents/grain ratio=3.7

50 lb/min×11000 grains/lb=550000 grains/min; indents/grain ratio=3.0

Typical operation of indent length graders in the grain cleaning industry for 23 inch diameter×85 inch long cylinders is a feed rate of 40-50 lb/min and rotation speeds of 46-50 rpm, leading to an indents/grain ratio of 2.7 to 3.4.

For the present invention, the indent cylinders employed are provided in a variety of diameters and lengths, as well as in different indent sizes. The keys to optimizing the removal of gluten containing grains is the size of the indents, the number of indents each grain is exposed to (indents/grain ratio) and the number of passes through various sized cylinders. With the above in mind, length grader 36 is, in accordance with one embodiment, operated in a preferred range of 10-20 lbs/min, with over 20% of the grain stream being directed into line 38. That is, a preferred form employs a $^{20}/_{64}$ indent cylinder for length grader 36 having a feed rate of 23 lb/min with an indents/grain ratio of 6.5, thereby providing a lifted reject stream of 6.0 lb/min or 26%. Basically, length grader 36 results in the loss of short grains, particularly 95% of short wheat, barley and rye grains, as well as short or stub oats. In this exemplary embodiment, length grader 41 also constitutes a $^{20}/_{64}$ inch diameter grader including an indent cylinder having a feed rate of 17 lb/min and an indents/grain ratio of 8.7 to establish a lifted reject stream of 1.7 lb/min or 10%. Finally, length grader 46 operates at even a slower lift reject stream. That is, length grader 46 is preferably constituted by a 22 or $^{23}/_{64}$ inch diameter length grader which is operated even slower, specifically at a feed rate of 15.3 lb/min with an indents/grain ratio of 9.7, thereby establishing a lifted reject stream of 0.25 lb/min. Here, mostly barley is targeted as a remaining contaminant grain, mainly remaining because the barley has a husk like the oats. In any case, this added step actually only removes about 1.6%. Overall, it has been shown that the invention is effectively carried out if the length grading operations are performed to achieve at least a 23% removal amount and preferably over 31%.

In connection with obtaining a very low gluten level and achieving gluten-free oats in accordance with the invention, the overall processing also employs a density separation step at 50 utilizing a density separator 51. In the art of grain separation, a density separator would normally be employed as an initial step, typically to remove stones, glass, metal and other heavy contaminants from an incoming grain stream. Although such an initial density separating operation could be included in connection with the overall process shown in FIG. 1, it has been found that providing density separator 51 downstream of the various grading stages can be employed to effectively remove numerous other gluten containing contaminants. More specifically, it has been found that certain remaining oat groats at this stage are associated with hairs (trichomes) that tend to hang onto gluten containing dust. With this in mind, density separator 51 is preferably run slow (e.g., about 780 bu/hr) to allow for these groats to migrate up in the separator for removal. Although only about 0.4% removal is achieved along line 53, this amount certainly contributes in further minimizing the final gluten level.

Finally, as clearly shown in this FIGURE, an addition aspiration step 55, utilizing an aspirator 75, is performed. Here, a high aspiration is preferably performed to blow off dust and other contaminants, including some wheat. A rate of about 770 bu/hr has been performed, achieving an additional 0.5% removal along line 58 in resulting in the gluten-free oats of the invention as indicated at 75. As set forth above, it has been found that contaminated oat grains can be processed in accordance with the invention to establish gluten-free oats 75 which actually have a gluten level of less than 10 ppm. Although current standards stipulate a maximum of 20 ppm gluten for a "gluten-free" food product, the present invention significantly improves upon this maximum level. In any case, the separated gluten-free oats 75, and even the contaminated grains conveyed through lines 33, 38, 43, 53 and 58 to milling return stream 34, can be further processed to produce a wide range of food products. The grains in milling return string 34 can actually be processed in other ways to establish reduced gluten oats, including establish gluten-free oats employing the method and system disclosed in co-pending and commonly assigned application filed on even date herewith under the same title. In any case, important in connection with the present invention, oats 75 can be used to produce various gluten-free food products, including cereals and granola-based products.

Based on the above, it should be apparent that the present invention establishes gluten-free oats without the need for any expensive or complicated optical equipment previously relied upon. Instead, the present invention is seen to advantageously rely on mechanical grain sorting techniques. This particular arrangement has been found to have certain costs and effectiveness advantages. In addition, the invention does not require de-hulling of the oats prior to processing through the system. Still, the invention has its limitations, particularly in that, of the original percentage of oats in the incoming, combined oats/foreign grain supply, only about 35% of this stream exists in the resulting gluten-free oat supply 75. Therefore, about 65% of the oats will remain in a contaminated form or would require other processing if low gluten levels were also desired for the remaining oats. Although described with respect to preferred embodiments of the invention, it should be readily understood that various changes and/or modifications can be made to the invention without departing from the spirit thereof. In particular, it should be recognized that the disclosed embodiments set forth a series of differentiation operations based on a preferred, exemplary configuration, such that the actual number and type of differentiation operations can vary in accordance with the overall invention, particularly depending on the amount of initial contamination, while keeping the overall unique processing characteristics. In addition, a wide range of processing equipment can be utilized in accordance with the invention to perform the series of differentiation operations as set forth above. Of course, the specific types of length and width graders are merely disclosed for the sake of completeness and other types of cleaning and sizing equipment could be employed without departing from the spirit of the invention. In any case, the invention is only intended to be limited by the scope of the following claims.

The invention claimed is:

1. A method of producing gluten-free oats from a combination of grains including oats and other, gluten containing grains comprising:
    performing a series of mechanical grading operations on the combination of grains to establish an initially processed combination of grains; and
    separating the initially processed combination of grains to remove gluten contaminated oat groats and to establish gluten-free oats.

2. The method of claim 1, wherein performing the series of mechanical grading operations includes both a series of width grading operations and a series of length grading operations on the combination of grains.

3. The method of claim 2, wherein the series of mechanical grading operations are performed on hulled oats.

4. The method of claim 2, further comprising performing the series of grading operations in combination with the separating being density separating to reduce a percentage of the other grains to less than approximately 0.035% by weight versus the oat grains.

5. The method of claim 2, wherein the separating constitutes density separating, with the method further comprising: aspirating, after density separating, the initially processed combination to establish the gluten-free oats.

6. The method of claim 5, further comprising: aspirating the combination of grains prior to performing the series of mechanical grading operations on the combination of grains.

7. The method of claim 2, wherein the length grading operations are performed to remove at least 23% of the combination of grains.

8. A method of producing gluten-free oats from a combination of grains including oats and other, gluten containing grains comprising: performing a series of mechanical differentiation operations on the combination of grains to remove the gluten containing grains and gluten contaminated oat groats to establish gluten-free oats.

9. The method of claim 8, wherein performing the series of mechanical differentiation operations includes subjecting the combination of grains to a series of grading operations including both a series of width grading operations and a series of length grading operations.

10. The method of claim 9, wherein performing the series of mechanical differentiation operations further includes density separating the combination of grains.

11. The method of claim 10, wherein performing the series of grading operations in combination with the density separating reduces a percentage of the other grains to less than approximately 0.035% by weight versus the oat grains.

12. The method of claim 10, further comprising: aspirating, after density separating, the combination of grains to establish the gluten-free oats.

13. The method of claim 12, further comprising: aspirating the combination of grains prior to performing the series of mechanical differentiation operations on the combination of grains.

14. The method of claim 9, wherein the length grading operations are performed to remove at least 23% of the combination of grains.

15. The method of claim 9, wherein the length grading operations includes at least three length grading operations performed at distinct feed rates.

16. The method of claim 8, wherein the series of mechanical differentiation operations are performed on hulled oats.

17. A system for producing gluten-free oats comprising:
a series of mechanical graders for initial processing of a combination of grains, including oat grains and foreign grains containing gluten to establish an initially processed combination of grains; and
a separator located downstream of the series of mechanical graders for performing a subsequent separation process on the initially processed combination of grains to remove gluten contaminated oat groats and to establish gluten-free oats.

18. The system according to claim 17, wherein the series of mechanical graders include both a series of width graders and a series of length graders.

19. The system according to claim 18, wherein the separator is a density separator, said system further comprising: an aspirator located downstream of the density separator.

20. The system according to claim 18, wherein the length graders include at least three graders arranged in succession and configured to operate at distinct, successively lower feed rates.

* * * * *